L. N. MOODY.
COVER FOR EVAPORATING PANS.
APPLICATION FILED MAR. 5, 1915.

1,191,982.

Patented July 25, 1916.
2 SHEETS—SHEET 1.

Witnesses

Inventor
Lewis N. Moody,
By Richard B. Owen,
Attorney

UNITED STATES PATENT OFFICE.

LEWIS N. MOODY, OF PLOVER, IOWA, ASSIGNOR OF ONE-HALF TO AMOS M. TOWER, OF BARTON, VERMONT.

COVER FOR EVAPORATING-PANS.

1,191,982.     Specification of Letters Patent.     Patented July 25, 1916.

Application filed March 5, 1915. Serial No. 12,401.

*To all whom it may concern:*

Be it known that I, LEWIS N. MOODY, a citizen of the United States, residing at Plover, in the county of Pocahontas and State of Iowa, have invented certain new and useful Improvements in Covers for Evaporating-Pans, of which the following is a specification.

This invention relates to an improved cover for evaporating pans which are used for boiling maple sap and like substances and the principal object of the invention is to provide a cover which is so constructed that the steam arising from the boiling sap will condense upon the cover and the water formed by the condensing steam will be led away from the cover through a pipe carried thereby, the steam heating the cover so that sap contained in a tray forming the top of the cover will be partially evaporated.

Another object of the invention is to so construct the cover that the water formed by the condensing steam cannot fall back into the evaporating pan.

Another object of the invention is to so construct the cover that the juice led to the pan may flow over the cover before passing into the evaporating pan thus becoming heated and partially evaporated before entering the evaporating pan.

Another object of the invention is to so construct the cover that it may be easily handled, the tray forming the top of the cover being separated from the body portion thereof to permit the interior of the cover to be easily reached.

Another object of the invention is to provide the cover with an improved type of longitudinally extending doors permitting access to be had to the evaporating pan.

This invention is illustrated in the accompanying drawings, wherein:—

Figure 1:
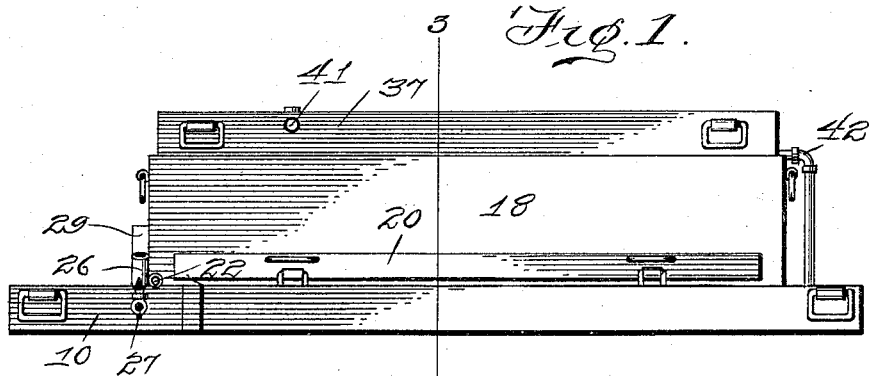
Figure 2:
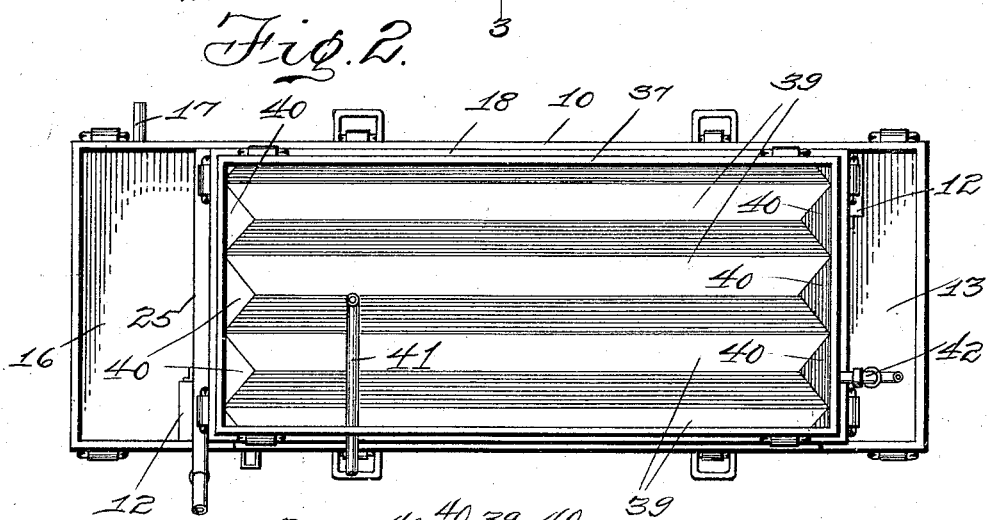
Figure 3:
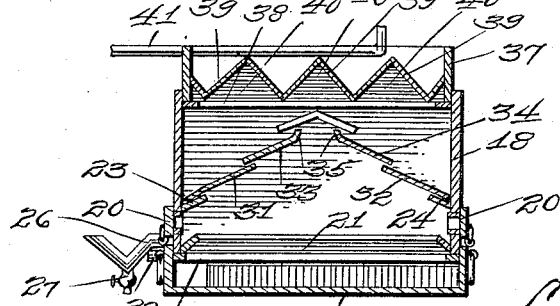
Figure 4:
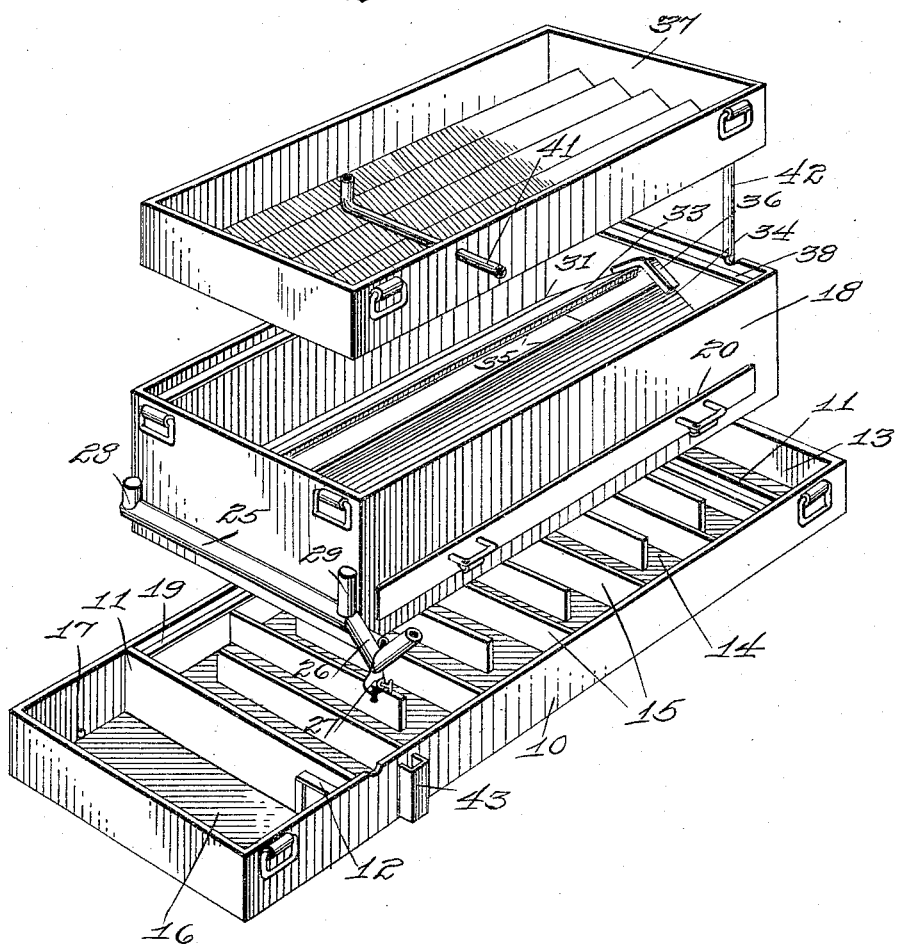

Figure 1 is a view showing the pan and improved cover in side elevation. Fig. 2 is a top plan view of the improved pan and cover. Fig. 3 is a transverse sectional view taken along the line 3—3 of Fig. 1. Fig. 4 is a perspective view showing the manner of assembling the cover and pan.

The evaporating pan 10 is provided with partitions 11 in each of which there is formed a passageway closed by sliding doors 12 to permit the flow of juice or syrup through the pan to be controlled. The end compartment 13 receives the juice which is to be boiled down and after the juice has passed through the central compartment 14 around the baffle plates 15 it passes through the doorway of the partition 11 into the end compartment 16 and through the outlet pipe 17 into a suitable receptacle.

The body portion 18 of the cover rests upon the inwardly extending ledge 19 of the tray 10 and is provided with longitudinally extending doors 20 so that when the body portion of the cover is in place the doors may be opened and access had to the evaporating pan. Within the cover 18 there has been provided a gutter 21 adjacent the lower edge of the cover which gutter communicates with an outlet pipe 22 so that water collecting in the gutter may flow out through the outlet pipe 22. A second gutter 23 is placed upon one side of the cover above the longitudinally extending door and a third 24 is placed upon the opposite side of the cover. These gutters 23 and 24 communicate with openings in the end wall of the cover so that water collecting in the gutters 23 and 24 may pass into the drain pipe 25 shown in Fig. 4. This drain pipe extends beyond the side of the cover and is provided with a trap 26 at the lower portion of which there is provided a drain cock 27 so that when desired water collecting in the trap may be drawn out. Branches 28 and 29 lead from the end portions of the drain pipe 25 and communicate with openings leading through the end wall of the cover.

Within the cover there has been provided an open partition formed from the longitudinally extending strips 31, 32, 33 and 34, the strips being positioned in overhanging relation so that water collecting upon the lower faces of the strips 33 and 34 may flow down upon the upper faces of the strips 31 and 32 and then flow along the strips 31 and 32 into the branch pipes 28 and 29 through the openings formed in the end wall of the cover. The strips 31 and 32 are positioned in spaced relation to the gutters 23 and 24 and therefore water collecting upon the lower faces of the strips will flow into the gutters and out through the openings in the end of the cover into the drain pipe. The strips 33 and 34 have their upper edge portions bent to form the flanges 35 and bridges 36 are mounted upon the end walls and overhang the space between the two side portions of the interrupted partition thus preventing water collecting upon the upper portion of the end walls from running down between the side portions of the partition. Of course water that collects upon the end walls beneath the partition will gather in the gutter 21 and flow out through the outlet pipe 22.

The tray 37 which forms the top of the cover rests upon the ledge 38 of the cover and is provided with longitudinally extending corrugations 39 having beveled end faces 40 so that water collecting upon the inner face of the tray may drain off the tray and into the trough of the cover. The supply pipe 41 which leads from a suitable vat or other receptacle for the juice passes through one of the walls of the tray to a point intermediate the width thereof so that the unboiled juice may be deposited in the tray from which after being heated and partially evaporated it will flow into the evaporating pan through the pipe 42. This pipe 42 leads to a point adjacent the bottom of the compartment 13 and it will thus be seen that the heated juice after leaving the tray will pass through the pipe 42 into the compartment 13 from which it will pass through the doorway 12 into the compartment 14 of the evaporating pan.

When this device is in use a fire is built under the evaporating pan and the syrup in the pan will boil until it has reached the desired thickness and will then be permitted to flow into the compartment 16 and out through the outlet pipe 17. A gage 43 may be provided upon the evaporating pan in order to readily ascertain the depth of the juice in the pan, and when it is discovered that there is not sufficient juice in the pan the door of partition 11 at one end of the pan may be opened to permit the juice to flow from the compartment 13 into the compartment 14 and drive the partly boiled juice toward the compartment 16. The second door 12 can be opened when the juice at one end of the pan is sufficiently boiled and the boiled juice will flow into the compartment 16. As the syrup is boiled the steam arising from the same will collect upon the sectional partition and tray forming the top of the cover and the water formed thereon by the condensing steam will flow through the various gutters into the drain pipe 25 and out through the same. If desired any suitable means can be provided for controlling the flow of the juice through the supply pipe and also any desired means can be provided for automatically controlling the flow of the juice through the pipe 42 into the compartment 13.

It will thus be seen that there has been provided means for covering the evaporating pan which will prevent dust and dirt from getting into the boiling syrup and which will cause the steam arising from the same to be condensed and the water formed thereby led away without falling back into the boiling syrup. Therefore the syrup will quickly reach the desired state and when it enters the compartment 16 it will be clean.

What is claimed is:—

1. In an evaporator, in combination an evaporating pan, a cover fitting upon said pan, a gutter mounted in said cover adjacent the lower edge thereof, a drain pipe carried by said cover and communicating with said gutter, a removable top for said cover, an interrupted partition in said cover formed of longitudinally extending strips positioned in overlapping relation, the lower strips engaging the side walls of said cover and forming gutters, gutters carried by said cover beneath said interrupted partition, and a drain pipe carried by said cover and communicating with said last mentioned gutters and provided with branches communicating with the gutters formed by the lower strips of said interrupted partition.

2. In an evaporator, in combination an evaporating pan, a cover for said evaporating pan, an interrupted partition in said cover engaging the side walls thereof to form gutters, gutters carried by said cover beneath said partition, a drain pipe carried by said cover and communicating with said last mentioned gutters, branches leading from said drain pipe and communicating with the gutters formed by said interrupted partition, a gutter carried by said cover adjacent the lower edge thereof, and a drain pipe communicating with said last mentioned gutter.

3. In an evaporator, in combination a cover, a top for said cover, an interrupted partition for said cover forming gutters at the sides thereof, a drain communicating with said gutters, and gutters spanning the space between the side portions of said interrupted partition.

4. In an evaporator, in combination a cover, a top for said cover, an interrupted partition for said cover forming gutters at the sides thereof, gutters carried by said cover beneath said interrupted partition, drain pipes communicating with all of said gutters, and bridges spanning the space between the side sections of said interrupted partition.

5. In an evaporator, in combination a cover, an interrupted partition mounted in said cover and formed from a plurality of side sections positioned in overlapping relation, certain of said side sections engaging the sides of said cover to form gutters, gutters carried by said cover beneath said interrupted partition, and drain means communicating with said last mentioned gutters and with the gutters formed by said interrupted partition.

6. In an evaporator, in combination a cover, doors carried by said body portion for closing openings formed therein, a gutter carried by said cover beneath said doors, a drain communicating with said gutter, an interrupted partition mounted in said cover above said doors and forming gutters, arms extending from said drain and communicating with the gutters formed by said partition, and gutters carried by said cover beneath said interrupted partition and communicating with said arms.

7. In an evaporator, in combination a cover open at its upper and lower ends, an interrupted partition mounted in said cover and forming gutters along the sides thereof, gutters mounted in said cover beneath said interrupted partition, drains communicating with said gutters, and a top for said cover provided with corrugations.

In testimony whereof I affix my signature in presence of two witnesses.

LEWIS N. MOODY.

Witnesses:
V. S. VERNUM,
CHARLES E. WATTS.

Copies of this patent may be obtained for five cents each, by addressing the "Commissioner of Patents, Washington, D. C."